United States Patent [19]

Moe

[11] 4,052,105

[45] Oct. 4, 1977

[54] TRUCK HOIST

[76] Inventor: Walter Moe, 502 S. 12th St., Montevideo, Minn. 56265

[21] Appl. No.: 675,509

[22] Filed: Apr. 9, 1976

[51] Int. Cl.² .............................................. B60P 1/20
[52] U.S. Cl. ................................. 298/22 J; 298/22 P
[58] Field of Search .................... 298/22 J, 22 P, 22 D

[56] References Cited

U.S. PATENT DOCUMENTS

| 1,188,932 | 6/1916 | Griffith | 298/22 D X |
|---|---|---|---|
| 1,940,043 | 12/1933 | Bordeaux | 298/22 D X |
| 3,809,429 | 5/1974 | Channell | 298/22 J |

*Primary Examiner*—Robert J. Spar
*Assistant Examiner*—George F. Abraham
*Attorney, Agent, or Firm*—Berman, Aisenberg & Platt

[57] ABSTRACT

A truck hoist assembly for use in combination with a dump vehicle having a chassis and a dump bed pivotally mounted to the rear of the chassis. A pair of relatively small sized hydraulic cylinders are pivotally connected adjacent the rear pivot of the dump bed, the distal ends of which are pivotally connected to an end of an elongated main lever. The other end of the main lever is pivotally connected to an elongated linkage assembly whose distal ends are, in turn, pivoted to the underside of the dump bed at a distance somewhat forwardly of a rear axle of the truck. The main lever is pivotally connected to the chassis at a fulcrum point which is substantially horizontally aligned with the dump bed pivot points when the bed is in its horizontal or down position. The assembly provides improved lifting leverage through the complete cycle of the hoist, especially near the top of the stoke, which in turn enables smaller and more economical hydraulic cylinders to be utilized.

14 Claims, 8 Drawing Figures

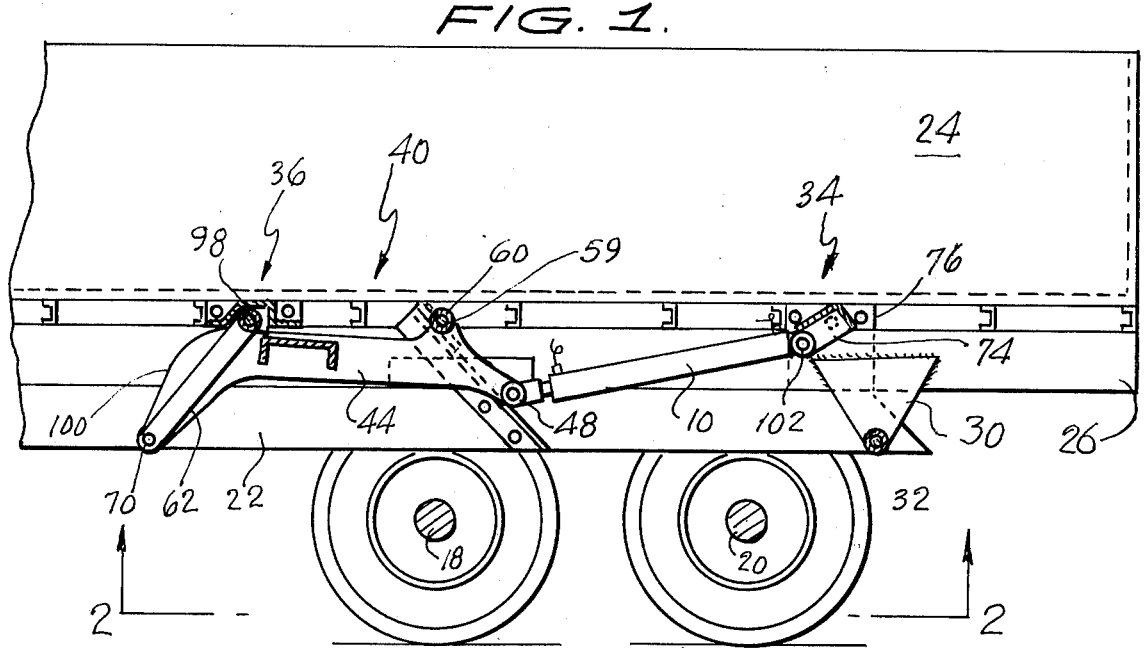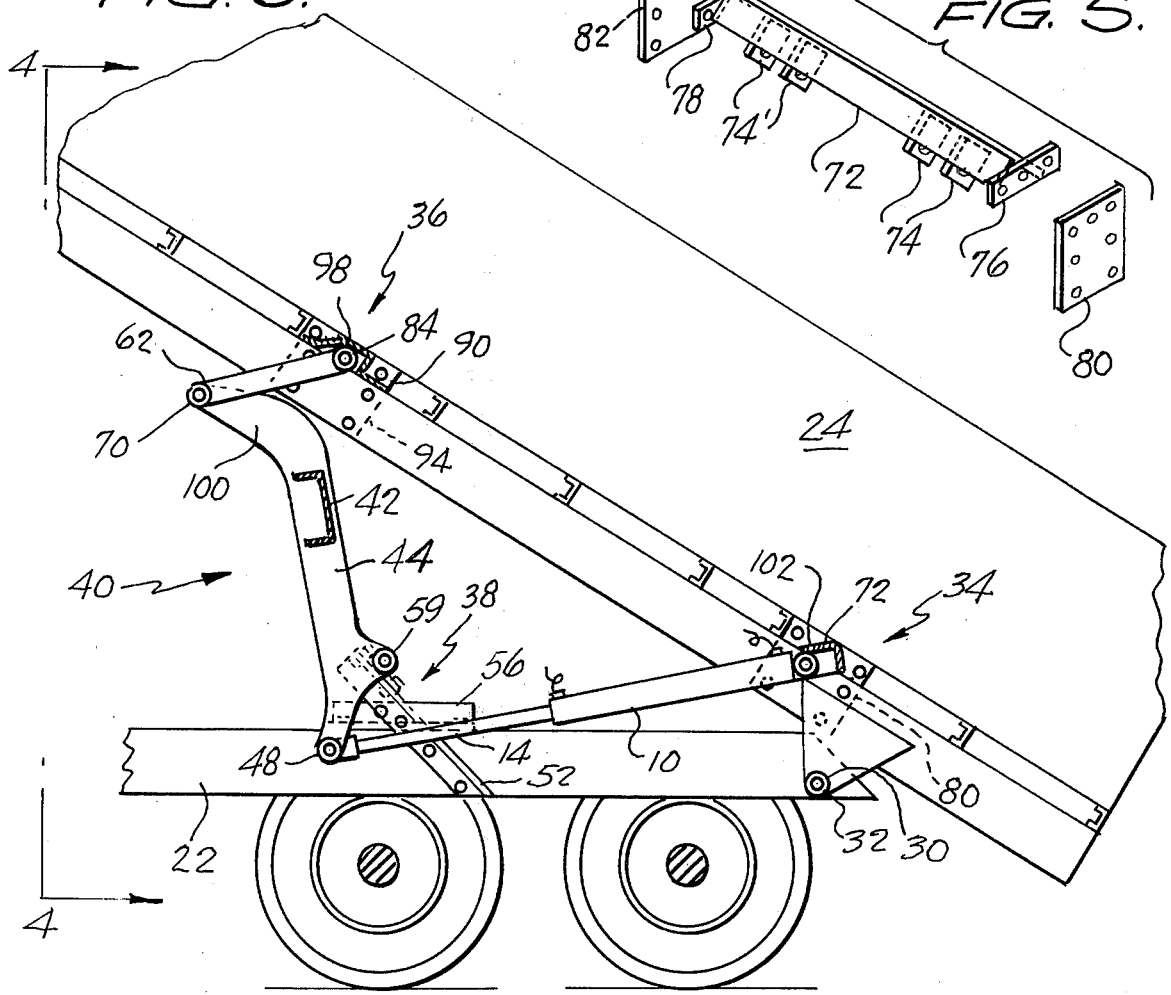

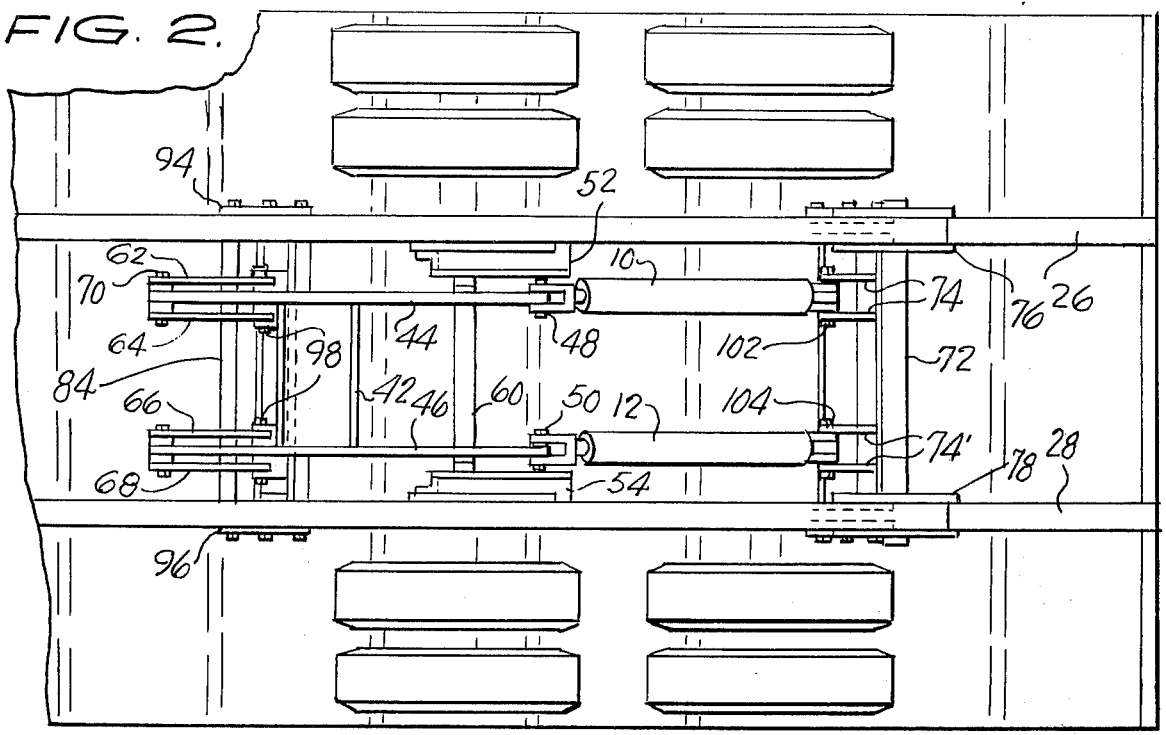

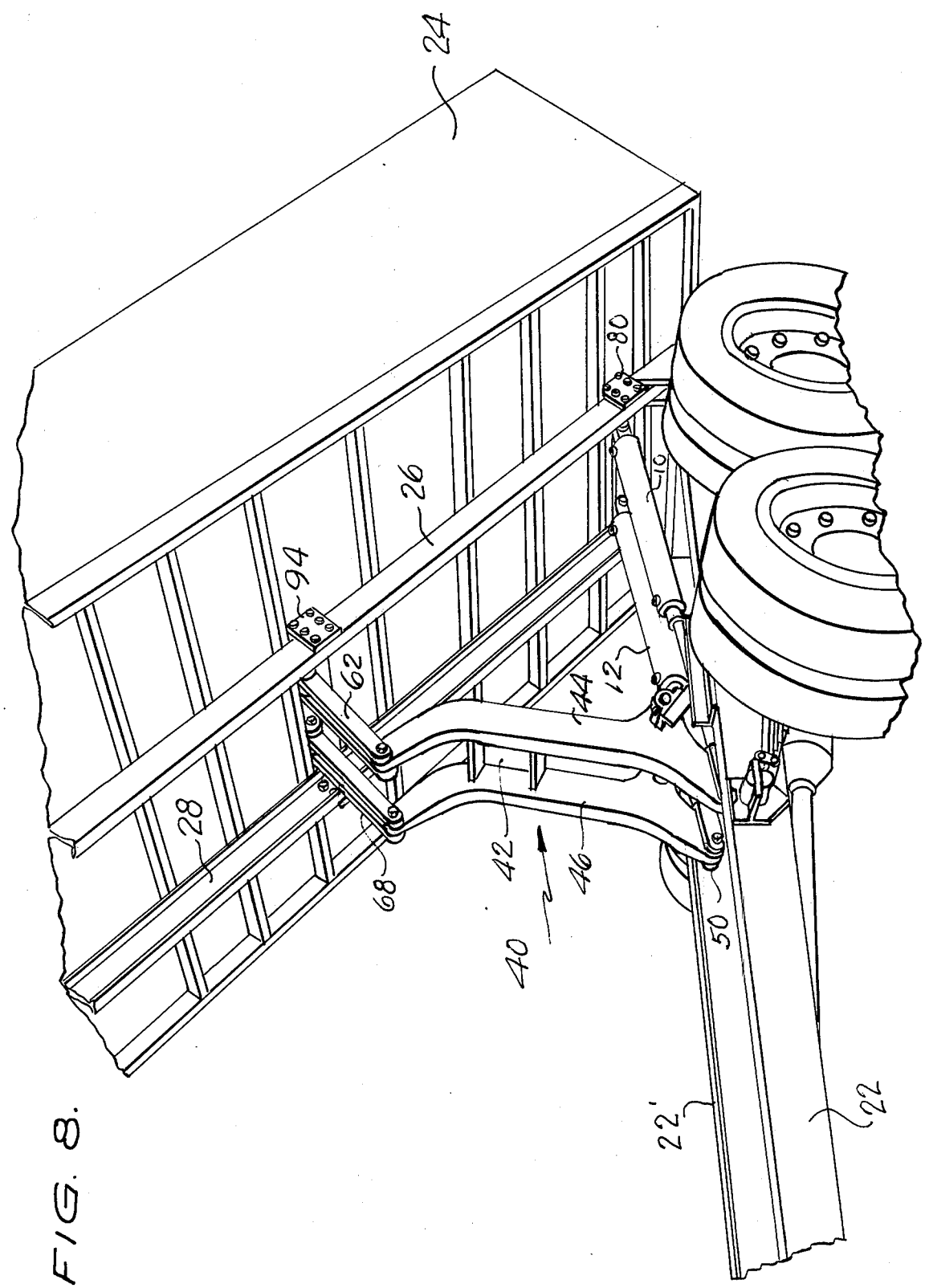

TRUCK HOIST

BACKGROUND OF THE INVENTION

1. Field of the Invention

The present invention is related to lifting mechanisms and, more particularly, is directed toward a lifting mechanism designed to hoist a dump bed from its chassis on a truck vehicle.

2. Description of the Prior Art

Many designs of lifting mechanisms for dump beds of trucks have been advanced, as exemplified by U.S. Pat. Nos. 3,572,521; 2,674,489; 3,317,062; and 2,640,725. The first-named Grey U.S. Pat. No. 3,572,521, believed closest in structure to the instant invention, illustrates a hydraulic cylinder 44 which is connected to a fixed bracket 50 on transfer table 38. The transfer table has an L-shaped extension pivoted at 40 to a bracket 42 which extends below load bed 16. The structure illustrated by Grey, however, requires and additional hydraulic cylinder 22 in order to pivot the load bed to its vertical position as shown in FIG. 1 thereof.

Most lifting mechanisms are designed in an attempt to achieve as great a force at the initiation of the lifting stroke as possible when the load bed must be moved from its horizontal rest postition. It is also generally desirable to provide a relatively constant leverage through the complete cycle of the stroke in order to minimize wear and tear on the working parts and to conserve power. Additionally, it is quite important to maintain leverage and power at the top of the stroke, near the end of the lifting cycle, in order to maximize the dump bed angle of inclination necessary with relatively heavy and/or wet loads, as can be appreciated by one skilled in the art.

Many of the prior art lifting mechanisms utilized for dump trucks fall short, in one or more of the foregoing aspects of achieving an ideal lifting cycle. In an attempt to provide a large initial force, many prior art lifting mechanisms employ one or more huge hydraulic cylinders, each of which may have two or three telescoping stages. Such hydraulic cylinders are bulky, quite expensive and are more prone to mechanical failure than less complex or smaller versions.

Further, and somewhat paradoxically, with the widely utilized two or three stage telescoping hoists, the lifting force is actually reduced as each of the second and third stages are employed. While many previous designs find it necessary to employ for example, a three stage telescoping cylindrical hoist to provide the requisite high final angle of inclination of the truck bed, as well as a high initial force, the subsequently reduced forces, especially near the top of the stroke, are highly disadvantageous, particularly when wet loads are being hauled which tend to remain stationary in the front of the dump bed and resist the normal tendency to slide rearwardly and be dumped.

Another problem encountered with prior art lifting mechanisms for dump beds is a tendency for the beds to tilt or twist about their longitudinal axis while being raised. This tilting or twisting tendency is particularly acute in those situations where heavy loads are being raised high by, for example, a pair of side-by-side three-stage hydraulic cylindrical hoists. If the load is not evenly distributed in the dump bed, or if the pair of outwardly telescoping cylinders do not extend evenly, twisting of the dump bed may result with concomitant damage.

OBJECTS AND SUMMARY OF THE INVENTION

It is therefore a primary object of the present invention to provide a lifting mechanism utilized to hoist a dump bed of a dump truck which provides an improved lifting force at the initiation of the stroke, better lifting leverage through the complete lifting cycle, and which maintains a high lifting force near the end of the stroke.

Another object of the present invention is to provide a truck hoist system which enables one to utilize less expensive, smaller diameter hydraulic hoists than heretofore possible, without any loss of load lifting capabilities.

A further object of the present invention is to provide a truck hoist which is simple in construction, easy to operate, and which does not require welding to be securely mounted within existing truck chassis.

A further object of the present invention is to provide a truck hoist mechanism which enables a lower bed profile on top of the truck chassis to be utilized.

A still further object of the present invention is to provide a lifting apparatus for a truck bed the incorporation of which enables the weight of the load to be carried approximately over the truck axle which reduces the strain on the chassis of the truck.

An additional object of the present invention is to provide a truck hoist apparatus which prevents the truck bed from twisting as the load is being raised.

The foregoing and other objects are attained in accordance with one aspect of the present invention through the provision of a truck hoist assembly for use in combination with a dump vehicle having a chassis and dump bed pivotally mounted to the chassis. The truck hoist assembly comprises linkage means which are pivotally connected to the dump bed, en elongated lever having one end pivotally connected to the linkage means and a fulcrum pivotally connected to the chassis, and actuation means which are pivotally connected to the other end of the elongated lever for selectively pivoting the lever about its fulcrum. The actuation means, which preferably comprises a pair of relatively small-diameter hydraulic cylinders, is further pivoted to the underside of the dump bed at a point adjacent the rear mounting thereof to the chassis.

The fulcrum of the elongated lever is positioned intermediate the ends of the lever and at a point about the pivotal connection of the piston of the hydraulic cylinders to the associated end of the main lever.

In accordance with the other aspects of the present invention, the pistons of the hydraulic cylinders define a substantially horizontal down position of the dump bed when they are substantially retracted within their respective cylinders, and further define a substantially inclined up position of the dump bed when they are substantially extended from their associated cylinders. In a preferred embodiment, the elongated lever preferably comprises a pair of substantially identical lever arms which are configured in a parallel spaced relationship and are rigidly joined by a cross arm member. Each of the parallel lever arms has a downwardly extending frontal portion at the end of which is located the pivotal connection to said linkage means.

In accordance with another aspect of the present invention, the linkage means comprises two pair of elongated substantially identical links which are pivotally connected at one end thereof to and on opposite sides of the downwardly extending frontal portions of the lever arms. A front bracket member is connected to the underside of the truck bed and includes means for pivotally mounting the other end of said two pair of elongated links. A rear bracket member is also provided and is connected to the underside of the truck bed and includes means for pivotally mounting the hydraulic cylinders, one piston of each of which is connected to the distal end of the pair of identical lever arms. The fulcrum of the lever arms is pivotally connected to a support member which is in approximate vertical alignment with one of the truck axles.

BRIEF DESCRIPTION OF THE DRAWINGS

Various objects, features and attendant advantages of the present invention will be more fully appreciated as the same become better understood from the following detailed description thereof when considered in connection with the accompanying drawings, wherein:

FIG. 1 is a side plan view of a preferred embodiment of the truck hoist assembly of the present invention shown in a first or down position, partially cut-away to show details of construction;

FIG. 2 is a bottom view of the preferred embodiment illustrated in FIG. 1 and taken along line 2—2 thereof;

FIG. 3 illustrates the same apparatus shown in FIG. 1 but in an intermediate lifting position;

FIG. 4 is an end view illustrating the relative position of the components illustrated in FIG. 3 and taken along line 4—4 thereof;

FIG. 5 is a perspective view illustrating the components and construction of a preferred embodiment rear bracket assembly utilized in the present invention;

FIG. 6 is a perspective view illustrating a preferred embodiment of a front bracket assembly utilized in the present invention;

FIG. 7 is a perspective view illustrating the details of construction of an intermediate pivot assembly utilized in conjunction with the preferred embodiment of the present invention; and FIG. 8 is a perspective view of the preferred embodiment of the truck hoist of the present invention illustrated in its full-up position at the end of its lifting cycle.

DETAILED DESCRIPTION OF THE PREFERRED EMBODIMENT

Referring now to the drawings, wherein like reference numerals represent identical or corresponding parts throughout the several views, and more particularly to FIGS. 1 and 2 thereof, there is illustrated a preferred embodiment of the truck hoist assembly of the present invention in a first or fully down position.

The truck bed 24 is illustrated as including a pair of side channels 26 and 28 extending longitudinally on the underside thereof. The truck bed 24 is pivotally attached to the truck chassis of frame 22 by a tail hinge 30. Tail hinge 30 is welded at its upper portion to channel 26 and is pivoted about pivot point 32 to the chassis 22 of the truck. The wheel axles 18 and 20 carry the wheels of the vehicle and are attached to the chassis 22 in a conventional manner (not shown).

The truck hoist assembly generally comprises a rear bracket assembly 34, a front bracket assembly 36, and an intermediate bracket assembly 38. Rear and front bracket assemblies 34 and 36, respectively, pivotally mount the truck hoist assembly to the truck bed 24, while the intermediate bracket assembly 38 serves as a pivot for the truck hoist assembly about chassis 22.

The main component of the truck hoist assembly itself includes a pair of relatively small-diameter hydraulic cylinders 10 and 12 each of which has associated cooperable piston rods 14 and 16, respectively. Cylinders 10 and 12 are pivotally connected at one end thereof to the rear bracket assembly 34, the details of the latter structure being more clearly illustrated in FIG. 5, to which attention is now directed.

The rear bracket assembly 34 comprises a rear bracket transverse support member 72. Connected to the underside of rear bracket transverse support member 72 are a pair of dual welded flanges 74 and 74'. Flanges 74 and 74' are provided with pivot pin apertures concentrically formed therein for receiving cooperating ends of hydraulic cylinders 10 and 12. Welded to the opposite ends of transverse suppor member 72 are a pair of side attaching plates 76 and 78 which serve to mount the transverse support member to a pair of side mounting plates 80 and 82, respectively. Side attaching plates 76 and 78 are mounted to the inside of channel members 26 and 28, respectively, while side mounting plates 80 and 82 may be bolted in place on the outer edges of channels 26 and 28.

Referring back to FIGS. 1 and 2, the truck hoist assembly is seen to further comprise an intermediate lift member or lever indicated generally by reference numeral 40. Lever 40 comprises a pair of substantially identical side of arm members 44 and 46 which are spaced in a parallel fashion and rigidly interconnected by virtue of a U-shaped welded cross member 42. At the rear end of arm members 44 and 46 are formed pivotal connections 48 and 50 to piston rods 14 and 16 of hydraulic cylinders 10 and 12, respectively. Lever 40 is provided with a fulcrum point 59 positioned somewhat forwardly of rear pivotal connections 48 and 50 and is somewhat vertically aligned with one of the rear axles 18 of the truck. Fulcrum 59 is defined by a bearing rod 60 extending through the upstanding fulcrum portion 59. Bearing rod 60 is mounted through the intermediate bracket assembly 38 shown in more detail in FIG. 7 to which attention is now directed.

The intermediate bracket assembly 38 consists of a pair of like assemblies, only one of which is illustrated in FIG. 7 for the sake of clarity. The right-intermediate bracket assembly pictured in FIG. 7 comprises a horizontal mounting bracket 58 which is bolted to the right side channel 28 of truck bed 24. Welded to the vertical inner edge of horizontal mounting bracket 58 is a diagonal mounting bracket 54 to which a pivot bearing 106 may be adjustably bolded. Pivot bearing 106 serves as the bearing for rod 60 of fulcrum 59 of the intermediate lever 40.

Referring back to FIGS. 1 and 2, lever member 40 is seen to further comprise a downwardly extending frontal portion 100 which terminates in another pivot point 70 having a pivot pin 70' extending therethrough. Pivotally attached intermediate the pivot point 70 of the downwardly extending portion 100 of intermediate lever 40 and the front bracket assembly 36 are a series of connecting linkages 62, 64, 66 and 68. As perhaps best viewed in FIG. 2, each of the linkages consist of an elongate link having apertured pivot points at respective ends thereof. Linkages 62 and 64 are disposed one on either side of side member 44, while linkages 66 and 68 are positioned respectively on opposite sides of identical side member 46. The distal ends of linkages 62, 64, 66 and 68 are pivotally connected to the front bracket assembly 36, the latter of which is illustrated in more detail in FIG. 6 to which attention is now directed.

The front bracket assembly 36 comprises a front bracket transverse support member 84 which is generally of a distended U-shaped channel configuration and has welded to the underside thereof a pair of mounting blocks 86 and 88 for linkages 62, 64, 66 and 68. Attached to the ends of front bracket transverse support member 84 are a pair of side attaching plates 90 and 92 for mounting member 84 to the inside walls of side channels 26 and 28, while a pair of side mounting plates 94 and 96 serve as the outer attaching means for mounting same to channels 26 and 28, respectively. The upper pivot points for linkages 62, 64, 66 and 68 to the blocks 86 and 88 is defined generally by reference numeral 98.

The operation of the truck hoist mechanism hereinabove described will now be set forth. The initial position of the components is as illustrated in FIGS. 1 and 2 with the pistons 14 and 16 being fully withdrawin within hydraulic cylinders 10 and 12, respectively, and with intermediate lever member 40 being substantially horizontal while the linkages 64-68 are in a parallel spaced relationship with the downwardly extending portion 100 of lever 40.

Upon actuation of hydraulic cylinders 10 and 12, intermediate lever member 40 pivots in the manner illustrated in FIGS. 3 and 4 so as to raise the truck bed 24 about fulcrum 59. As the intermediate position illustrated in FIG. 4 is attained, further extension of pistons 12 and 14 from hydraulic cylinders 10 and 12 will move pivot points 70 to the right as illustrated in FIG. 3 and, hence, force upper pivot point 98 upwardly so as to provide further and additional leverage for inclining truck bed 24 even farther. The final position of the components when the truck bed 24 is in its fully inclined or extended position at the end of the hoist cycle is illustrated in FIG. 8. The additional leverage provided by linkages 62-68 and the unique design of intermediate lever member 40 is evident.

A less expensive pair of hydraulic cylinders are required due to the improved lifting force at the start of the hoisting cycle. As a result, the smaller diameter cylinders enables the truck bed 24 to be lifted more rapidly than one equipped with the larger diameter, relatively expensive, slow moving, two or three stage telescoping hoists. A better lifting leverage is provided through the complete cycle of the hoist, especially near the end of the cycle which assists in the dumping of wet, inertia-prone loads, such as sugar beets, wet gravel, or the like.

The present invention also provides a lower profile of the truck bed 24 on top of the truck chassis 22. The low profile is in distict contradistinction to some of the prior art scissor hoists in which it is sometimes necessary to remove two or three cross channels in the truck bed in order to provide enough room for the hoist mechanism to give the hydraulic cylinders the proper angle of leverage to initiate the lifting of the load. Further, as explained hereinabove, utilization of the two or three-stage telescoping hoist results in a reduction of lifting force as the second and third stages are deployed. The present invention, on the other hand, provides a better angle of leverage inasmuch as the cylinder and main lever are at approximately a 90° angle throughout most of the hoisting cycle, until near the end of the cycle, where the angle of leverage is somewhat reduced at the front of the cylinder. However, the knuckle joint effect of the linkages 62 through 68 increases the leverage near the top of the stroke, so as to provide a nearly constant leverage throughout the entire hoisting cycle.

As illustrated in FIGS. 1 and 2, the weight of the load is carried approximately over the axles of the truck, instead of farther forward as in the prior art devices, which results in a reduced strain on the truck chassis. Furthermore, since the intermediate lever member 40 is a unitary welded together member, both side members 44 and 46 are simultaneously actuated and must lift together, as a unit, to substantially inhibit the possibility of any twisting as the load is being lifted. A further advantage of the present invention is that less strain is placed on the truck bed 24 since a lifting force is provided at four distinct points, rather than at only two points. Finally, the simplified construction of the essential components of the present invention provides for greater simplicity in mounting the entire assembly to a truck bed and chassis inasmuch as no welding in necessary. The side plates may simply be bolted on and corresponding holes may be drilled in the side channels of the truck bed, with subsequent straightforward bolting together.

Obviously, numerous modifications and valuations of the present invention are possible in light of the above teachings. It is therefore to be understood that within the scope of the appended claims the invention may be practiced otherwise than as specifically described herein.

I claim as my invention:

1. A truck hoist assembly for use in combination with a dump vehicle having a chassis and dump bed pivotally mounted to said chassis, which comprises:
   linkage means pivotally connected to said dump bed;
   elongated lever means having one end pivotally connected to said linkage means and a fulcrum pivotally connected intermediate the ends of said lower means to said chassis; and
   actuation means pivotally connected to the other end of said elongated lever means and to said dump bed for selectively pivoting said lever means about said fulcrum.

2. The truck hoist assembly as set forth in claim 1, wherein said actuation means comprises hydraulic cylinder means.

3. The truck hoist assembly as set forth in claim 2, wherein said hydraulic cylinder means comprises a first cylinder pivotally mounted to and near the rear end of said dump bed, and a first cooperating piston movable within said first cylinder and pivotally connected to said other end of said elongated lever means.

4. The truck hoist assembly as set forth in claim 3, wherein said first piston defines a substantially horizontal down position of said dump bed when substantially retracted within said first cylinder and defines a substantially inclined up position of said dump bed when substantially extended from said first cylinder.

5. The truck hoist assembly as set forth in claim 4, wherein said elongated lever means comprises a pair of substantially identical lever arms configured in a parallel spaced relationship and rigidly joined by a cross arm member, each of said lever arms having a downwardly extending frontal portion at the end of which is located the pivotal connection to said linkage means.

6. The truck hoist assembly as set forth in claim 5, wherein said linkage means comprises two pair of elongated substantially identical links pivotally connected at one end thereof to and on opposite sides of said downwardly extending frontal portions of said lever arms.

7. The truck hoist assembly as set forth in claim 6 further comprising a front bracket member connected to the underside of said truck bed and including means for pivotally mounting the other ends of said two pair of elongated links.

8. The truck hoist assembly as set forth in claim 7 further comprising a rear bracket member connected to the underside of said truck bed and including means for pivotally mounting said hydraulic cylinder means thereto.

9. The truck hoist assembly as set forth in claim 8, wherein said hydraulic cylinder means further comprises a second cylinder pivotally mounted to said rear bracket mounting means and a second cooperating piston movable within said second cylinder and pivotally connected to said other end of said elongated lever means.

10. The truck hoist assembly as set forth in claim 9, wherein said first and second pistons are respectively pivotally mounted one to each of said pair of substantially identical lever arms at the rear ends thereof opposite to that of said downwardly extending frontal portions.

11. The truck hoist assembly as set forth in claim 10 further comprising means connected to said chassis for pivotally mounting said pair of substantially identical lever arms thereto.

12. The truck hoist assembly as set forth in claim 4, wherein said down position of said dump bed is further defined by the substantially horizontal alignment of said fulcrum with the pivotal connection of said linkage means to said dump bed.

13. The truck hoist assembly as set forth in claim 12, wherein said dump bed is pivotally mounted to the rear end of said chassis, and wherein the pivotal connection of said actuation means to said dump bed is in proximal relation to said rear end of said chassis.

14. A truck hoist assembly, which comprises:
a dump vehicle having a chassis and a dump bed pivotally mounted at a first pivot point near the rear end of said chassis;
a linkage having one end pivotally mounted to said dump bed at a second pivot point spaced forwardly from said first pivot point;
a lever having one end pivotally mounted to the other end of said linkage at a third pivot point spaced below said second pivot point;
said lever also pivotally mounted to said chassis at a fourth pivot point spaced in repose between said first and second pivot points; and
a hydraulic cylinder having one end pivotally mounted to said lever at a fifth pivot point spaced below said fourth pivot point, the other end of said hydraulic cylinder being pivotally mounted to said dump bed at a sixth pivot point spaced rewardly of said second pivot point.

* * * * *